(12) United States Patent
Dean et al.

(10) Patent No.: US 8,600,122 B2
(45) Date of Patent: Dec. 3, 2013

(54) APPARATUS AND METHOD FOR CULLING SUBSTANTIALLY REDUNDANT DATA IN FINGERPRINT SENSING CIRCUITS

(75) Inventors: Gregory Lewis Dean, Standish, ME (US); Erik Jonathon Thompson, Phoenix, AZ (US); Frank Schwab, Phoenix, AZ (US); Richard Alexander Erhart, Tempe, AZ (US)

(73) Assignee: Validity Sensors, Inc., San Jose, CA (US)

( * ) Notice: Subject to any disclaimer, the term of this patent is extended or adjusted under 35 U.S.C. 154(b) by 940 days.

(21) Appl. No.: 12/354,680

(22) Filed: Jan. 15, 2009

(65) Prior Publication Data

US 2010/0177940 A1     Jul. 15, 2010

(51) Int. Cl.
  *G06K 9/00*     (2006.01)
(52) U.S. Cl.
  USPC .............................. 382/124; 382/125; 382/115
(58) Field of Classification Search
  USPC ................................... 382/124, 125, 115, 181
  See application file for complete search history.

(56) References Cited

U.S. PATENT DOCUMENTS

| | | | |
|---|---|---|---|
| 3,593,319 A | 7/1971 | Barber | |
| 4,151,512 A | 4/1979 | Rigannati et al. | |
| 4,225,850 A | 9/1980 | Chang et al. | |
| 4,310,827 A | 1/1982 | Asi | |
| 4,353,056 A | 10/1982 | Tsikos | |
| 4,405,829 A | 9/1983 | Rivest et al. | |
| 4,525,859 A | 6/1985 | Bowles et al. | |
| 4,550,221 A | 10/1985 | Mabusth | |
| 4,580,790 A | 4/1986 | Doose | |
| 4,582,985 A | 4/1986 | Loftberg | |
| 4,675,544 A | 6/1987 | Shrenk | |
| 4,758,622 A | 7/1988 | Gosselin | |
| 4,817,183 A | 3/1989 | Sparrow | |

(Continued)

FOREIGN PATENT DOCUMENTS

| | | | |
|---|---|---|---|
| DE | 2213813 A1 | 10/1973 | |
| EP | 0791899 A2 | 8/1997 | |

(Continued)

OTHER PUBLICATIONS

Hiltgen, et al., "Secure Internet Banking Authentication", IEEE Security and Privacy, IEEE Computer Society, New York, NY, US, Mar. 1, 2006, pp. 24-31, XP007908655, ISSN: 1540-7993.

(Continued)

*Primary Examiner* — Ruiping Li
(74) *Attorney, Agent, or Firm* — Greenberg Traurig LLP; Cecily Anne O'Regan; William C. Cray

(57) ABSTRACT

An apparatus for culling substantially redundant data in a fingerprint sensing circuit is disclosed in one embodiment of the invention as including an input module, a storage module, a comparator module, and a determination module. The input module may receive sets of data samples from an array of fingerprint sensing elements. The sets of data samples may be stored by the storage module. The comparator module may calculate a difference between each data sample from a first-received set, and a corresponding data sample from a second-received set. The determination module may count the number of difference values that exceed a predetermined difference limit, and identify the second set of data samples as redundant if the number of difference values counted is less than a pre-set count limit.

20 Claims, 6 Drawing Sheets

(56) References Cited

U.S. PATENT DOCUMENTS

| | | |
|---|---|---|
| 5,076,566 A | 12/1991 | Kriegel |
| 5,079,949 A | 1/1992 | Tamori |
| 5,109,427 A | 4/1992 | Yang |
| 5,140,642 A | 8/1992 | Hau et al. |
| 5,270,949 A | 12/1993 | Atherton et al. |
| 5,305,017 A | 4/1994 | Gerpheide |
| 5,319,323 A | 6/1994 | Fong |
| 5,325,442 A | 6/1994 | Knapp |
| 5,359,243 A | 10/1994 | Norman |
| 5,420,936 A | 5/1995 | Fitzpatrick et al. |
| 5,422,807 A | 6/1995 | Mitra et al. |
| 5,429,006 A | 7/1995 | Tamori |
| 5,456,256 A | 10/1995 | Schneider et al. |
| 5,515,738 A | 5/1996 | Tamori |
| 5,543,591 A | 8/1996 | Gillespie et al. |
| 5,569,901 A | 10/1996 | Bridgelall et al. |
| 5,623,552 A | 4/1997 | Lane |
| 5,627,316 A | 5/1997 | De Winter et al. |
| 5,650,842 A | 7/1997 | Maase et al. |
| 5,717,777 A | 2/1998 | Wong et al. |
| 5,781,651 A | 7/1998 | Hsiao et al. |
| 5,801,681 A | 9/1998 | Sayag |
| 5,818,956 A | 10/1998 | Tuli |
| 5,828,773 A | 10/1998 | Setlak et al. |
| 5,838,306 A | 11/1998 | O'Connor |
| 5,844,287 A | 12/1998 | Hassan et al. |
| 5,848,176 A | 12/1998 | Harra et al. |
| 5,850,450 A | 12/1998 | Schweitzer et al. |
| 5,852,670 A | 12/1998 | Setlak et al. |
| 5,864,296 A | 1/1999 | Upton |
| 5,887,343 A | 3/1999 | Salatino et al. |
| 5,892,824 A | 4/1999 | Beatson et al. |
| 5,903,225 A | 5/1999 | Schmitt et al. |
| 5,915,757 A | 6/1999 | Tsuyama et al. |
| 5,920,384 A | 7/1999 | Borza |
| 5,920,640 A | 7/1999 | Salatino et al. |
| 5,940,526 A | 8/1999 | Setlak et al. |
| 5,963,679 A | 10/1999 | Setlak |
| 5,995,630 A | 11/1999 | Borza |
| 5,999,637 A | 12/1999 | Toyoda et al. |
| 6,002,389 A | 12/1999 | Kasser |
| 6,002,815 A | 12/1999 | Immega et al. |
| 6,011,859 A | 1/2000 | Kalnitsky et al. |
| 6,016,355 A | 1/2000 | Dickinson et al. |
| 6,052,475 A | 4/2000 | Upton |
| 6,067,368 A | 5/2000 | Setlak et al. |
| 6,073,343 A | 6/2000 | Petrick et al. |
| 6,076,566 A | 6/2000 | Lowe |
| 6,088,585 A | 7/2000 | Schmitt et al. |
| 6,098,175 A | 8/2000 | Lee |
| 6,118,318 A | 9/2000 | Fifield et al. |
| 6,134,340 A | 10/2000 | Hsu et al. |
| 6,157,722 A | 12/2000 | Lerner et al. |
| 6,161,213 A | 12/2000 | Lofstrom |
| 6,175,407 B1 | 1/2001 | Santor |
| 6,182,076 B1 | 1/2001 | Yu et al. |
| 6,182,892 B1 | 2/2001 | Angelo et al. |
| 6,185,318 B1 | 2/2001 | Jain et al. |
| 6,234,031 B1 | 5/2001 | Suga |
| 6,241,288 B1 | 6/2001 | Bergenek et al. |
| 6,259,108 B1 | 7/2001 | Antonelli et al. |
| 6,289,114 B1 * | 9/2001 | Mainguet ............ 382/124 |
| 6,292,272 B1 | 9/2001 | Okauchi et al. |
| 6,317,508 B1 | 11/2001 | Kramer et al. |
| 6,320,394 B1 | 11/2001 | Tartagni |
| 6,325,285 B1 | 12/2001 | Baratelli |
| 6,327,376 B1 | 12/2001 | Harkin |
| 6,330,345 B1 | 12/2001 | Russo et al. |
| 6,332,193 B1 | 12/2001 | Glass et al. |
| 6,333,989 B1 | 12/2001 | Borza |
| 6,337,919 B1 | 1/2002 | Dunton |
| 6,343,162 B1 | 1/2002 | Saito et al. |
| 6,346,739 B1 | 2/2002 | Lepert et al. |
| 6,347,040 B1 | 2/2002 | Fries et al. |
| 6,357,663 B1 | 3/2002 | Takahashi et al. |
| 6,360,004 B1 | 3/2002 | Akizuki |
| 6,362,633 B1 | 3/2002 | Tartagni |
| 6,392,636 B1 | 5/2002 | Ferrari et al. |
| 6,399,994 B2 | 6/2002 | Shobu |
| 6,400,836 B2 | 6/2002 | Senior |
| 6,408,087 B1 | 6/2002 | Kramer |
| 6,459,804 B2 | 10/2002 | Mainguet |
| 6,473,072 B1 | 10/2002 | Comiskey et al. |
| 6,481,294 B2 | 11/2002 | Zellner et al. |
| 6,509,501 B2 | 1/2003 | Eicken et al. |
| 6,512,381 B2 | 1/2003 | Kramer |
| 6,525,547 B2 | 2/2003 | Hayes |
| 6,525,932 B1 | 2/2003 | Ohnishi et al. |
| 6,535,622 B1 | 3/2003 | Russo et al. |
| 6,539,101 B1 | 3/2003 | Black |
| 6,546,122 B1 | 4/2003 | Russo |
| 6,580,816 B2 | 6/2003 | Kramer et al. |
| 6,597,289 B2 | 7/2003 | Sabatini |
| 6,628,812 B1 | 9/2003 | Setlak et al. |
| 6,631,201 B1 | 10/2003 | Dickinson et al. |
| 6,643,389 B1 | 11/2003 | Raynal et al. |
| 6,672,174 B2 | 1/2004 | Deconde et al. |
| 6,710,461 B2 | 3/2004 | Chou et al. |
| 6,738,050 B2 | 5/2004 | Comiskey et al. |
| 6,741,729 B2 | 5/2004 | Bjorn et al. |
| 6,757,002 B1 | 6/2004 | Oross et al. |
| 6,766,040 B1 | 7/2004 | Catalano et al. |
| 6,785,407 B1 | 8/2004 | Tschudi et al. |
| 6,799,275 B1 | 9/2004 | Bjorn et al. |
| 6,836,230 B2 | 12/2004 | Le Pailleur et al. |
| 6,838,905 B1 | 1/2005 | Doyle |
| 6,862,942 B2 | 3/2005 | Kawahata |
| 6,873,356 B1 | 3/2005 | Kanbe et al. |
| 6,886,104 B1 | 4/2005 | McClurg et al. |
| 6,897,002 B2 | 5/2005 | Teraoka et al. |
| 6,898,299 B1 | 5/2005 | Brooks |
| 6,924,496 B2 | 8/2005 | Manansala |
| 6,937,748 B1 | 8/2005 | Schneider et al. |
| 6,941,001 B1 | 9/2005 | Bolle et al. |
| 6,941,810 B2 | 9/2005 | Okada |
| 6,950,540 B2 | 9/2005 | Higuchi |
| 6,959,874 B2 | 11/2005 | Bardwell |
| 6,963,626 B1 | 11/2005 | Shaeffer et al. |
| 6,970,584 B2 | 11/2005 | O'Gorman et al. |
| 6,980,672 B2 | 12/2005 | Saito et al. |
| 6,983,882 B2 | 1/2006 | Cassone |
| 7,013,030 B2 | 3/2006 | Wong et al. |
| 7,020,591 B1 | 3/2006 | Wei et al. |
| 7,030,860 B1 | 4/2006 | Hsu et al. |
| 7,031,670 B2 | 4/2006 | May |
| 7,035,443 B2 | 4/2006 | Wong |
| 7,042,535 B2 | 5/2006 | Katoh et al. |
| 7,043,061 B2 | 5/2006 | Hamid et al. |
| 7,043,644 B2 | 5/2006 | DeBruine |
| 7,046,230 B2 | 5/2006 | Zadesky et al. |
| 7,064,743 B2 | 6/2006 | Nishikawa |
| 7,099,496 B2 | 8/2006 | Benkley |
| 7,110,574 B2 | 9/2006 | Haruki et al. |
| 7,110,577 B1 | 9/2006 | Tschud |
| 7,113,622 B2 | 9/2006 | Hamid |
| 7,126,389 B1 | 10/2006 | McRae et al. |
| 7,129,926 B2 | 10/2006 | Mathiassen et al. |
| 7,136,514 B1 | 11/2006 | Wong |
| 7,146,024 B2 | 12/2006 | Benkley |
| 7,146,026 B2 | 12/2006 | Russon et al. |
| 7,146,029 B2 | 12/2006 | Manansala |
| 7,184,581 B2 | 2/2007 | Johansen et al. |
| 7,190,209 B2 | 3/2007 | Kang et al. |
| 7,190,816 B2 | 3/2007 | Mitsuyu et al. |
| 7,194,392 B2 | 3/2007 | Tuken et al. |
| 7,197,168 B2 | 3/2007 | Russo |
| 7,200,250 B2 | 4/2007 | Chou |
| 7,251,351 B2 | 7/2007 | Mathiassen et al. |
| 7,258,279 B2 | 8/2007 | Schneider et al. |
| 7,260,246 B2 | 8/2007 | Fujii |
| 7,263,212 B2 | 8/2007 | Kawabe |
| 7,263,213 B2 | 8/2007 | Rowe |
| 7,289,649 B1 | 10/2007 | Walley et al. |
| 7,290,323 B2 | 11/2007 | Deconde et al. |

(56) References Cited

U.S. PATENT DOCUMENTS

| | | |
|---|---|---|
| 7,308,121 B2 | 12/2007 | Mathiassen et al. |
| 7,308,122 B2 | 12/2007 | McClurg et al. |
| 7,321,672 B2 | 1/2008 | Sasaki et al. |
| 7,356,169 B2 | 4/2008 | Hamid |
| 7,360,688 B1 | 4/2008 | Harris |
| 7,369,685 B2 | 5/2008 | DeLeon |
| 7,379,569 B2 | 5/2008 | Chikazawa et al. |
| 7,408,135 B2 | 8/2008 | Fujeda |
| 7,409,876 B2 | 8/2008 | Ganapathi et al. |
| 7,412,083 B2 | 8/2008 | Takahashi |
| 7,424,618 B2 | 9/2008 | Roy et al. |
| 7,447,339 B2 | 11/2008 | Mimura et al. |
| 7,447,911 B2 | 11/2008 | Chou et al. |
| 7,460,697 B2 | 12/2008 | Erhart et al. |
| 7,463,756 B2 | 12/2008 | Benkley |
| 7,474,772 B2 | 1/2009 | Russo et al. |
| 7,505,611 B2 | 3/2009 | Fyke |
| 7,505,613 B2 | 3/2009 | Russo |
| 7,565,548 B2 | 7/2009 | Fiske et al. |
| 7,574,022 B2 | 8/2009 | Russo |
| 7,596,832 B2 | 10/2009 | Hsieh et al. |
| 7,599,530 B2 | 10/2009 | Boshra |
| 7,616,787 B2 | 11/2009 | Boshra |
| 7,634,117 B2 | 12/2009 | Cho |
| 7,643,950 B1 | 1/2010 | Getzin et al. |
| 7,646,897 B2 | 1/2010 | Fyke |
| 7,681,232 B2 | 3/2010 | Nordentoft et al. |
| 7,689,013 B2 | 3/2010 | Shinzaki |
| 7,706,581 B2 | 4/2010 | Drews et al. |
| 7,733,697 B2 | 6/2010 | Picca et al. |
| 7,734,074 B2 * | 6/2010 | Setlak et al. ......... 382/124 |
| 7,751,601 B2 | 7/2010 | Benkley |
| 7,826,645 B1 | 11/2010 | Cayen |
| 7,843,438 B2 | 11/2010 | Onoda |
| 7,848,798 B2 | 12/2010 | Martinsen et al. |
| 7,899,216 B2 | 3/2011 | Watanabe et al. |
| 7,953,258 B2 | 5/2011 | Dean et al. |
| 8,005,276 B2 | 8/2011 | Dean et al. |
| 8,031,916 B2 | 10/2011 | Abiko et al. |
| 8,063,734 B2 | 11/2011 | Conforti |
| 8,077,935 B2 | 12/2011 | Geoffroy et al. |
| 8,107,212 B2 | 1/2012 | Nelson et al. |
| 8,116,540 B2 | 2/2012 | Dean et al. |
| 8,131,026 B2 | 3/2012 | Benkley et al. |
| 8,165,355 B2 | 4/2012 | Benkley et al. |
| 8,175,345 B2 | 5/2012 | Gardner |
| 8,204,281 B2 | 6/2012 | Satya et al. |
| 8,224,044 B2 | 7/2012 | Benkley |
| 8,229,184 B2 | 7/2012 | Benkley |
| 8,276,816 B2 | 10/2012 | Gardner |
| 8,278,946 B2 | 10/2012 | Thompson |
| 8,290,150 B2 | 10/2012 | Erhart et al. |
| 8,315,444 B2 | 11/2012 | Gardner |
| 8,331,096 B2 | 12/2012 | Garcia |
| 8,358,815 B2 | 1/2013 | Benkley et al. |
| 8,374,407 B2 | 2/2013 | Benkley et al. |
| 8,391,568 B2 | 3/2013 | Satyan |
| 8,447,077 B2 | 5/2013 | Benkley et al. |
| RE44,440 E | 8/2013 | Getzin et al. |
| 8,520,913 B2 | 8/2013 | Dean et al. |
| 2001/0026636 A1 | 10/2001 | Mainget |
| 2001/0030644 A1 | 10/2001 | Allport |
| 2001/0036299 A1 | 11/2001 | Senior |
| 2001/0043728 A1 | 11/2001 | Kramer et al. |
| 2002/0014530 A1 | 2/2002 | Iihama |
| 2002/0025062 A1 | 2/2002 | Black |
| 2002/0061125 A1 | 5/2002 | Fujii |
| 2002/0064892 A1 | 5/2002 | Lepert et al. |
| 2002/0067845 A1 | 6/2002 | Griffis |
| 2002/0089044 A1 | 7/2002 | Simmons et al. |
| 2002/0089410 A1 | 7/2002 | Janiak et al. |
| 2002/0096731 A1 | 7/2002 | Wu et al. |
| 2002/0122026 A1 | 9/2002 | Bergstrom |
| 2002/0126516 A1 | 9/2002 | Jeon |
| 2002/0133725 A1 | 9/2002 | Roy et al. |
| 2002/0152048 A1 | 10/2002 | Hayes |
| 2002/0181749 A1 | 12/2002 | Matsumoto et al. |
| 2003/0002717 A1 | 1/2003 | Hamid |
| 2003/0002719 A1 | 1/2003 | Hamid et al. |
| 2003/0021495 A1 | 1/2003 | Cheng |
| 2003/0035570 A1 | 2/2003 | Benkley |
| 2003/0063782 A1 | 4/2003 | Acharya et al. |
| 2003/0068072 A1 | 4/2003 | Hamid |
| 2003/0076301 A1 | 4/2003 | Tsuk et al. |
| 2003/0076303 A1 | 4/2003 | Huppi |
| 2003/0095096 A1 | 5/2003 | Robbin et al. |
| 2003/0095690 A1 | 5/2003 | Su et al. |
| 2003/0102874 A1 | 6/2003 | Lane et al. |
| 2003/0123714 A1 | 7/2003 | O'Gorman et al. |
| 2003/0123715 A1 | 7/2003 | Uchida |
| 2003/0141959 A1 | 7/2003 | Keogh et al. |
| 2003/0147015 A1 | 8/2003 | Katoh et al. |
| 2003/0161510 A1 | 8/2003 | Fuji |
| 2003/0161512 A1 | 8/2003 | Mathiassen et al. |
| 2003/0169228 A1 | 9/2003 | Mathiassen et al. |
| 2003/0174871 A1 | 9/2003 | Yoshioka et al. |
| 2003/0186157 A1 | 10/2003 | Teraoka et al. |
| 2003/0209293 A1 | 11/2003 | Sako et al. |
| 2003/0224553 A1 | 12/2003 | Manansala |
| 2004/0012773 A1 | 1/2004 | Puttkammer |
| 2004/0017934 A1 | 1/2004 | Kocher et al. |
| 2004/0021786 A1 | 2/2004 | Nakamura et al. |
| 2004/0022001 A1 | 2/2004 | Chu et al. |
| 2004/0042642 A1 | 3/2004 | Bolle et al. |
| 2004/0050930 A1 | 3/2004 | Rowe |
| 2004/0066613 A1 | 4/2004 | Leitao |
| 2004/0076313 A1 | 4/2004 | Bronstein et al. |
| 2004/0081339 A1 | 4/2004 | Benkley |
| 2004/0096086 A1 | 5/2004 | Miyasaka et al. |
| 2004/0113956 A1 | 6/2004 | Bellwood et al. |
| 2004/0120400 A1 | 6/2004 | Linzer |
| 2004/0125993 A1 | 7/2004 | Zhao et al. |
| 2004/0129787 A1 | 7/2004 | Saito |
| 2004/0136612 A1 | 7/2004 | Meister et al. |
| 2004/0155752 A1 | 8/2004 | Radke |
| 2004/0172339 A1 | 9/2004 | Snelgrove et al. |
| 2004/0179718 A1 | 9/2004 | Chou |
| 2004/0184641 A1 | 9/2004 | Nagasaka et al. |
| 2004/0188838 A1 | 9/2004 | Okada et al. |
| 2004/0190761 A1 | 9/2004 | Lee |
| 2004/0208346 A1 | 10/2004 | Baharav et al. |
| 2004/0208347 A1 | 10/2004 | Baharav et al. |
| 2004/0208348 A1 | 10/2004 | Baharav et al. |
| 2004/0213441 A1 | 10/2004 | Tschudi |
| 2004/0215689 A1 | 10/2004 | Dooley et al. |
| 2004/0228505 A1 | 11/2004 | Sugimoto |
| 2004/0228508 A1 | 11/2004 | Shigeta |
| 2004/0240712 A1 | 12/2004 | Rowe et al. |
| 2004/0252867 A1 | 12/2004 | Lan et al. |
| 2005/0031174 A1 | 2/2005 | Ryhanen et al. |
| 2005/0036665 A1 | 2/2005 | Higuchi |
| 2005/0047485 A1 | 3/2005 | Khayrallah et al. |
| 2005/0100196 A1 | 5/2005 | Scott et al. |
| 2005/0100938 A1 | 5/2005 | Hoffmann et al. |
| 2005/0103611 A1 | 5/2005 | Holscher |
| 2005/0109835 A1 | 5/2005 | Jacoby et al. |
| 2005/0110103 A1 | 5/2005 | Setlak |
| 2005/0111708 A1 | 5/2005 | Chou |
| 2005/0123176 A1 | 6/2005 | Ishil et al. |
| 2005/0129291 A1 | 6/2005 | Boshra |
| 2005/0136200 A1 | 6/2005 | Durell et al. |
| 2005/0139656 A1 | 6/2005 | Arnouse |
| 2005/0139685 A1 | 6/2005 | Kozlay |
| 2005/0162402 A1 | 7/2005 | Watanachote |
| 2005/0169503 A1 | 8/2005 | Howell et al. |
| 2005/0174015 A1 | 8/2005 | Scott et al. |
| 2005/0210271 A1 | 9/2005 | Chou et al. |
| 2005/0219200 A1 | 10/2005 | Weng |
| 2005/0220329 A1 | 10/2005 | Payne et al. |
| 2005/0231213 A1 | 10/2005 | Chou et al. |
| 2005/0238212 A1 | 10/2005 | Du et al. |
| 2005/0244038 A1 | 11/2005 | Benkley |
| 2005/0244039 A1 | 11/2005 | Geoffroy et al. |
| 2005/0247559 A1 | 11/2005 | Frey et al. |

(56) References Cited

U.S. PATENT DOCUMENTS

| | | |
|---|---|---|
| 2005/0249386 A1 | 11/2005 | Juh |
| 2005/0258952 A1 | 11/2005 | Utter et al. |
| 2005/0269402 A1 | 12/2005 | Spitzer et al. |
| 2006/0006224 A1 | 1/2006 | Modi |
| 2006/0055500 A1 | 3/2006 | Burke et al. |
| 2006/0057756 A1 | 3/2006 | Sato et al. |
| 2006/0066572 A1 | 3/2006 | Yumoto et al. |
| 2006/0076926 A1 | 4/2006 | Lee |
| 2006/0078176 A1 | 4/2006 | Abiko et al. |
| 2006/0083411 A1 | 4/2006 | Benkley |
| 2006/0110537 A1 | 5/2006 | Huang et al. |
| 2006/0140461 A1 | 6/2006 | Kim et al. |
| 2006/0144953 A1 | 7/2006 | Takao |
| 2006/0170528 A1 | 8/2006 | Fukushige et al. |
| 2006/0181521 A1 | 8/2006 | Perrault et al. |
| 2006/0182319 A1 | 8/2006 | Setlank et al. |
| 2006/0187200 A1 | 8/2006 | Martin |
| 2006/0210082 A1 | 9/2006 | Devadas et al. |
| 2006/0214512 A1 | 9/2006 | Iwata |
| 2006/0214767 A1 | 9/2006 | Carrieri |
| 2006/0239514 A1 | 10/2006 | Watanabe et al. |
| 2006/0249008 A1 | 11/2006 | Luther |
| 2006/0259873 A1 | 11/2006 | Mister |
| 2006/0261174 A1 | 11/2006 | Zellner et al. |
| 2006/0267125 A1 | 11/2006 | Huang et al. |
| 2006/0267385 A1 | 11/2006 | Steenwyk et al. |
| 2006/0271793 A1 | 11/2006 | Devadas et al. |
| 2006/0285728 A1 | 12/2006 | Leung et al. |
| 2006/0287963 A1 | 12/2006 | Steeves et al. |
| 2007/0031011 A1 | 2/2007 | Erhart et al. |
| 2007/0036400 A1 | 2/2007 | Watanabe et al. |
| 2007/0057763 A1 | 3/2007 | Blattner et al. |
| 2007/0058843 A1 | 3/2007 | Theis et al. |
| 2007/0067828 A1 | 3/2007 | Bychkov |
| 2007/0076926 A1 | 4/2007 | Schneider et al. |
| 2007/0076951 A1 | 4/2007 | Tanaka et al. |
| 2007/0086634 A1 | 4/2007 | Setlak et al. |
| 2007/0090312 A1 | 4/2007 | Stallinga et al. |
| 2007/0138299 A1 | 6/2007 | Mitra |
| 2007/0154072 A1 | 7/2007 | Taraba et al. |
| 2007/0160269 A1 | 7/2007 | Kuo |
| 2007/0180261 A1 | 8/2007 | Akkermans et al. |
| 2007/0196002 A1 | 8/2007 | Choi et al. |
| 2007/0198141 A1 | 8/2007 | Moore |
| 2007/0198435 A1 | 8/2007 | Siegal et al. |
| 2007/0228154 A1 | 10/2007 | Tran |
| 2007/0237366 A1 | 10/2007 | Maletsky |
| 2007/0237368 A1 | 10/2007 | Bjorn et al. |
| 2007/0248249 A1 | 10/2007 | Stoianov |
| 2007/0290124 A1 | 12/2007 | Neil et al. |
| 2008/0002867 A1 | 1/2008 | Mathiassen et al. |
| 2008/0013805 A1 | 1/2008 | Sengupta et al. |
| 2008/0019578 A1 | 1/2008 | Saito et al. |
| 2008/0049987 A1 | 2/2008 | Champagne et al. |
| 2008/0049989 A1 | 2/2008 | Iseri et al. |
| 2008/0063245 A1 | 3/2008 | Benkley et al. |
| 2008/0069412 A1 | 3/2008 | Champagne et al. |
| 2008/0126260 A1 | 5/2008 | Cox et al. |
| 2008/0169345 A1 | 7/2008 | Keane et al. |
| 2008/0170695 A1 | 7/2008 | Adler et al. |
| 2008/0175450 A1 | 7/2008 | Scott et al. |
| 2008/0178008 A1 | 7/2008 | Takahashi et al. |
| 2008/0179112 A1 | 7/2008 | Qin et al. |
| 2008/0185429 A1 | 8/2008 | Saville |
| 2008/0201265 A1 | 8/2008 | Hewton |
| 2008/0205714 A1 | 8/2008 | Benkley et al. |
| 2008/0219521 A1* | 9/2008 | Benkley et al. ............... 382/124 |
| 2008/0222049 A1 | 9/2008 | Loomis et al. |
| 2008/0223925 A1 | 9/2008 | Saito et al. |
| 2008/0226132 A1 | 9/2008 | Gardner |
| 2008/0238878 A1 | 10/2008 | Wang |
| 2008/0240523 A1 | 10/2008 | Benkley et al. |
| 2008/0240537 A1 | 10/2008 | Yang et al. |
| 2008/0244277 A1 | 10/2008 | Orsini et al. |
| 2008/0267462 A1 | 10/2008 | Nelson et al. |
| 2008/0279373 A1 | 11/2008 | Erhart et al. |
| 2008/0317290 A1 | 12/2008 | Tazoe |
| 2009/0001999 A1 | 1/2009 | Douglas |
| 2009/0130369 A1 | 5/2009 | Huang et al. |
| 2009/0140838 A1 | 6/2009 | Newman et al. |
| 2009/0153297 A1 | 6/2009 | Gardner |
| 2009/0154779 A1 | 6/2009 | Satyan et al. |
| 2009/0155456 A1 | 6/2009 | Benkley et al. |
| 2009/0169071 A1 | 7/2009 | Bond et al. |
| 2009/0174974 A1 | 7/2009 | Huang et al. |
| 2009/0212902 A1 | 8/2009 | Haddock |
| 2009/0218698 A1 | 9/2009 | Lam |
| 2009/0237135 A1 | 9/2009 | Ramaraju et al. |
| 2009/0252384 A1 | 10/2009 | Dean et al. |
| 2009/0252385 A1 | 10/2009 | Dean et al. |
| 2009/0252386 A1 | 10/2009 | Dean et al. |
| 2009/0279742 A1 | 11/2009 | Abiko |
| 2009/0319435 A1 | 12/2009 | Little et al. |
| 2009/0324028 A1 | 12/2009 | Russo |
| 2010/0026451 A1 | 2/2010 | Erhart et al. |
| 2010/0045705 A1 | 2/2010 | Vertegaal et al. |
| 2010/0083000 A1 | 4/2010 | Kesanupalli et al. |
| 2010/0117224 A1 | 5/2010 | McElrea et al. |
| 2010/0117794 A1 | 5/2010 | Adams et al. |
| 2010/0119124 A1 | 5/2010 | Satyan |
| 2010/0123657 A1 | 5/2010 | Shimizu |
| 2010/0127366 A1 | 5/2010 | Bond et al. |
| 2010/0176823 A1 | 7/2010 | Thompson et al. |
| 2010/0176892 A1 | 7/2010 | Thompson et al. |
| 2010/0177940 A1 | 7/2010 | Thompson et al. |
| 2010/0180136 A1 | 7/2010 | Thompson et al. |
| 2010/0189314 A1 | 7/2010 | Benkley et al. |
| 2010/0208953 A1 | 8/2010 | Gardner et al. |
| 2010/0244166 A1 | 9/2010 | Shibuta et al. |
| 2010/0272329 A1 | 10/2010 | Benkley |
| 2010/0284565 A1 | 11/2010 | Benkley et al. |
| 2011/0002461 A1 | 1/2011 | Erhart et al. |
| 2011/0018556 A1 | 1/2011 | Le et al. |
| 2011/0083018 A1 | 4/2011 | Kasanupalli et al. |
| 2011/0083170 A1 | 4/2011 | Kasanupalli et al. |
| 2011/0090047 A1 | 4/2011 | Patel |
| 2011/0102567 A1 | 5/2011 | Erhart |
| 2011/0102569 A1 | 5/2011 | Erhart |
| 2011/0175703 A1 | 7/2011 | Benkley |
| 2011/0176037 A1 | 7/2011 | Benkley |
| 2011/0182486 A1* | 7/2011 | Valfridsson et al. ......... 382/124 |
| 2011/0214924 A1 | 9/2011 | Perezselsky et al. |
| 2011/0221942 A1 | 9/2011 | Taura |
| 2011/0267298 A1 | 11/2011 | Erhart et al. |
| 2011/0298711 A1 | 12/2011 | Dean et al. |
| 2011/0304001 A1 | 12/2011 | Erhart et al. |
| 2012/0044639 A1 | 2/2012 | Garcia |
| 2012/0148122 A1 | 6/2012 | Dean et al. |
| 2012/0189166 A1 | 7/2012 | Russo |
| 2012/0189172 A1 | 7/2012 | Russo |
| 2012/0206586 A1 | 8/2012 | Gardner |
| 2012/0256280 A1 | 10/2012 | Erhart et al. |
| 2012/0257032 A1 | 10/2012 | Benkley |
| 2012/0308092 A1 | 12/2012 | Benkley et al. |
| 2013/0021044 A1 | 1/2013 | Thompson et al. |
| 2013/0094715 A1 | 4/2013 | Benkley et al. |
| 2013/0177220 A1 | 7/2013 | Erhart et al. |

FOREIGN PATENT DOCUMENTS

| | | |
|---|---|---|
| EP | 0791899 A3 | 8/1997 |
| EP | 0791899 B1 | 8/1997 |
| EP | 0929028 A2 | 1/1998 |
| EP | 0905646 A1 | 3/1999 |
| EP | 0973123 A1 | 1/2000 |
| EP | 1018697 A2 | 7/2000 |
| EP | 1139301 A2 | 10/2001 |
| EP | 1531419 A2 | 5/2005 |
| EP | 1533759 A1 | 5/2005 |
| EP | 1536368 A1 | 6/2005 |
| EP | 1538548 A2 | 6/2005 |
| EP | 1624399 B1 | 2/2006 |
| EP | 1775674 A1 | 4/2007 |
| EP | 1939788 A1 | 7/2008 |

(56) References Cited

FOREIGN PATENT DOCUMENTS

| | | |
|---|---|---|
| EP | 2343677 A1 | 7/2011 |
| EP | 2343679 A1 | 7/2011 |
| GB | 2331613 A | 5/1999 |
| GB | 2480919 | 12/2011 |
| GB | 2487661 A1 | 8/2012 |
| GB | 2489100 A | 9/2012 |
| GB | 2490192 | 10/2012 |
| GB | 2474999 B | 2/2013 |
| GB | 2499497 | 8/2013 |
| JP | 01094418 A2 | 4/1989 |
| JP | 04158434 A2 | 6/1992 |
| JP | 2003256820 A | 9/2003 |
| JP | 2005011002 A | 1/2005 |
| JP | 2005242856 | 9/2005 |
| JP | 2006053768 | 6/2006 |
| JP | 2007305097 A | 11/2007 |
| JP | 3569804 B2 | 9/2009 |
| TW | 200606745 A | 2/2006 |
| TW | 200606746 | 2/2006 |
| TW | 200614092 | 5/2006 |
| TW | 200617798 | 6/2006 |
| TW | 200620140 A | 6/2006 |
| TW | 200629167 A | 8/2006 |
| WO | WO 90/03620 A1 | 4/1990 |
| WO | WO 98/58342 A1 | 12/1998 |
| WO | WO 99/28701 A1 | 6/1999 |
| WO | WO 99/43258 A1 | 9/1999 |
| WO | WO 99/46724 A1 | 9/1999 |
| WO | WO 01/22349 A1 | 3/2001 |
| WO | WO 01/59558 A1 | 8/2001 |
| WO | WO 01/94902 A2 | 12/2001 |
| WO | WO 01/94902 A3 | 12/2001 |
| WO | WO 01/95304 A1 | 12/2001 |
| WO | WO 02/11066 A1 | 2/2002 |
| WO | WO 02/47018 A2 | 6/2002 |
| WO | WO 02/47018 A3 | 6/2002 |
| WO | WO 02/061668 A1 | 8/2002 |
| WO | WO 02/077907 A1 | 10/2002 |
| WO | WO 03/063054 A2 | 7/2003 |
| WO | WO 03/075210 A2 | 9/2003 |
| WO | WO 2004/066194 A1 | 8/2004 |
| WO | WO 2004/066693 A1 | 8/2004 |
| WO | WO 2005/104012 A1 | 11/2005 |
| WO | WO 2005/106774 A2 | 11/2005 |
| WO | WO 2005/106774 A3 | 11/2005 |
| WO | WO 2006/040724 | 4/2006 |
| WO | WO 2006/041780 A1 | 4/2006 |
| WO | WO 2007/011607 A1 | 1/2007 |
| WO | WO 2008/033264 A2 | 3/2008 |
| WO | WO 2008/033264 A3 | 3/2008 |
| WO | WO 2008/033265 A2 | 6/2008 |
| WO | WO 2008/033265 A3 | 6/2008 |
| WO | WO 2008/137287 A1 | 11/2008 |
| WO | WO 2009/002599 A2 | 12/2008 |
| WO | WO 2009/002599 A3 | 12/2008 |
| WO | WO 2009/029257 A1 | 6/2009 |
| WO | WO 2009/079219 A1 | 6/2009 |
| WO | WO 2009/079221 A2 | 6/2009 |
| WO | WO 2009/079257 A1 | 6/2009 |
| WO | WO 2009/079262 A1 | 6/2009 |
| WO | WO 2010/034036 A1 | 3/2010 |
| WO | WO 2010/036445 A1 | 4/2010 |
| WO | WO 2010/143597 A1 | 12/2010 |
| WO | WO 2011/088248 A1 | 1/2011 |
| WO | WO/2011/088252 A1 | 1/2011 |
| WO | WO 2011/053797 | 5/2011 |

OTHER PUBLICATIONS

Hegt, "Analysis of Current and Future Phishing Attacks on Internet Banking Services", Mater Thesis. Techische Universiteit Eindhoven—Department of Mathematics and Computer Science May 31, 2008, pp. 1-149, XP002630374, Retrieved from the Internet: URL:http://alexandria.tue.nl/extral/afstversl/wsk-i/hgt2008.pdf [retrieved on Mar. 29, 2011] *pp. 127-134, paragraph 6.2*.

Matsumoto et al., Impact of Artificial "Gummy" Fingers on Fingerprint Systems, SPIE 4677 (2002), reprinted from cryptome.org.

Maltoni, "Handbook of Fingerprint Recognition", XP002355942 Springer, New York, USA, Jun. 2003 pp. 65-69.

Vermasan, et al., "A500 dpi AC Capacitive Hybrid Flip-Chip CMOS ASIC/Sensor Module for Fingerprint, Navigation, and Pointer Detection With On-Chip Data Processing", IEEE Journal of Solid State Circuits, vol. 38, No. 12, Dec. 2003, pp. 2288-2294.

Ratha, et al. "Adaptive Flow Orientation Based Feature Extraction in Fingerprint Images," Pattern Recognition, vol. 28 No. 11, 1657-1672, Nov. 1995.

Ratha, et al., "A Real Time Matching System for Large Fingerprint Databases," IEEE, Aug. 1996.

Suh, et al., "Design and Implementation of the AEGIS Single-Chip Secure Processor Using Physical Random Functions", Computer Architecture, 2005, ISCA '05, Proceedings, 32nd International Symposium, Jun. 2005 (MIT Technical Report CSAIL CSG-TR-843, 2004.

Rivest, et al., "A Method for Obtaining Digital Signatures and Public-Key Cryptosystems", Communication of the ACM, vol. 21 (2), pp. 120-126. (1978).

Gassend, et al., "Controlled Physical Random Functions", In Proceedings of the 18th Annual Computer Security Conference, Las Vegas, Nevada, Dec. 12, 2002.

Wikipedia (Mar. 2003). "Integrated Circuit," http://en.wikipedia.org/wiki/integrated_circuit. Revision as of Mar. 23, 2003.

Wikipedia (Dec. 2006). "Integrated circuit" Revision as of Dec. 10, 2006. http://en.widipedia.org/wiki/Integrated_circuit.

Bellagiodesigns.Com (Internet Archive Wayback Machine, www.bellagiodesigns.com date: Oct. 29, 2005).

Closed Loop Systems, The Free Dictionary, http://www.thefreedictionary.com/closed-loop+system (downloaded Dec. 1, 2011).

Feedback: Electronic Engineering, Wikipedia, p. 5 http://en.wikipedia.org/wiki/Feedback#Electronic_engineering (downloaded Dec. 1, 2011).

Galy et al. (Jul. 2007) "A full fingerprint verification system for a single-line sweep sensor." IEEE Sensors J., vol. 7 No. 7, pp. 1054-1065.

* cited by examiner

|          | Sample 1 ~200 | Sample 2 | Sample 3 | Sample 4 | Sample 5 | Sample 6 | Sample 7 | Sample 8 | Sample 9 | Sample 10 | Sample 11 | Sample 12 | ... | Sample x |
|----------|---|---|---|---|---|---|---|---|---|---|---|---|---|---|
| 202—Line 1 | | | | | | | | | | | | | | |
| Line 2 | | | | | | | | | | | | | | |
| Line 3 | | | | | | | | | | | | | | |
| Line 4 | | | | | | | | | | | | | | |
| ⋮ | | | | | | | | | | | | | | |
| Line x | | | | | | | | | | | | | | |

Fig. 2

|          | Sample 1 ~200a | Sample 2 ~200b | Sample 3 ~200c | Sample 4 ~200d | Sample 5 ~200e | Sample 6 ~200f | Sample 7 ~200g | Sample 8 ~200h | Sample 9 ~200i | Sample 10 ~200j | Sample 11 ~200k | Sample 12 ~200l | ... | Sample x ~200m |
|----------|---|---|---|---|---|---|---|---|---|---|---|---|---|---|
| 202a—Line 1 | | | | | | | | | | | | | | |
| 202b—Line 2 | X | | | | | | | | X | | | | | |
| 202c—Line 3 | X | X | | | | | | | X | | | X | | |
| 202d—Line 4 | X | X | | X | | | | X | X | | | X | | |
| ⋮ | | | | | | | | | | | | | | |
| 202e—Line x | | | | | | | | | | | | | | |

204 refers to the table.

Fig. 3

APPARATUS AND METHOD FOR CULLING SUBSTANTIALLY REDUNDANT DATA IN FINGERPRINT SENSING CIRCUITS

BACKGROUND

This invention relates to biometric authentication devices and, more particularly, to apparatus and methods for culling substantially redundant data in fingerprint sensing circuits.

Fingerprint recognition and authentication systems are well recognized and highly reputed as reliable, non-intrusive ways to verify individual identity. Historically, however, the size and cost of fingerprint sensors needed to implement fingerprint recognition and authentication technology have limited their widespread use. Indeed, many conventional fingerprint recognition technologies often utilize large fingerprint sensing components (e.g., integrated circuits), rendering them impracticable and often cost-prohibitive for many portable or small applications, such as personal digital assistants, peripheral computer components, or cell phones.

Recent developments in fingerprint recognition and authentication systems have focused on "swipe"-type fingerprint sensors that significantly reduce the real estate needed to digitally capture and verify fingerprints. Particularly, such sensors provide a small-area sensor element that repeatedly scans portions (e.g., lines) of a fingerprint as it is swiped over the sensor. Later, the portions may be reconstructed to provide a complete fingerprint image for recognition and authentication purposes.

In many "swipe"-type fingerprint sensors, data acquired from the fingerprint sensor must be transmitted to a host system to enable image reconstruction and fingerprint image recognition and authentication. Often, redundant information is unnecessarily transmitted, stored, and processed by the host system as a result of time-dependent sampling that fails to account for slower swipe speeds or a lack of motion across the sensor. The redundant information and resources needed to process the redundant information unnecessarily and undesirably consumes large amounts of bandwidth, memory, and power in both the fingerprint sensing circuit and the host system.

In view of the foregoing, what is needed is an apparatus and method for reducing the amount of redundant data that is generated by "swipe"-type fingerprint sensors and transmitted to host fingerprint recognition and authentication systems. Ideally, such an apparatus and method would reduce the amount of energy, bandwidth, and memory that is required to transmit and store fingerprint data. Further needed are apparatus and methods for efficiently detecting motion across "swipe"-type fingerprint sensors. As will become evident herein, apparatus and methods in accordance with the invention satisfy many, if not all, of the above-stated needs.

BRIEF DESCRIPTION OF THE DRAWINGS

In order that the advantages of the invention will be readily understood, a more particular description of the invention briefly described above will be rendered by reference to specific examples illustrated in the appended drawings. Understanding that these drawings depict only typical examples of the invention and are not therefore to be considered limiting of its scope, the invention will be described and explained with additional specificity and detail through the use of the accompanying drawings, in which:

FIG. 2 is a chart showing "lines" of data samples received from the fingerprint sensing elements;

FIG. 3 is a chart showing the data samples of FIG. 2 and highlighting samples that are significantly different from the last unique line, or reference line, of data samples;

DETAILED DESCRIPTION

Figure 1:
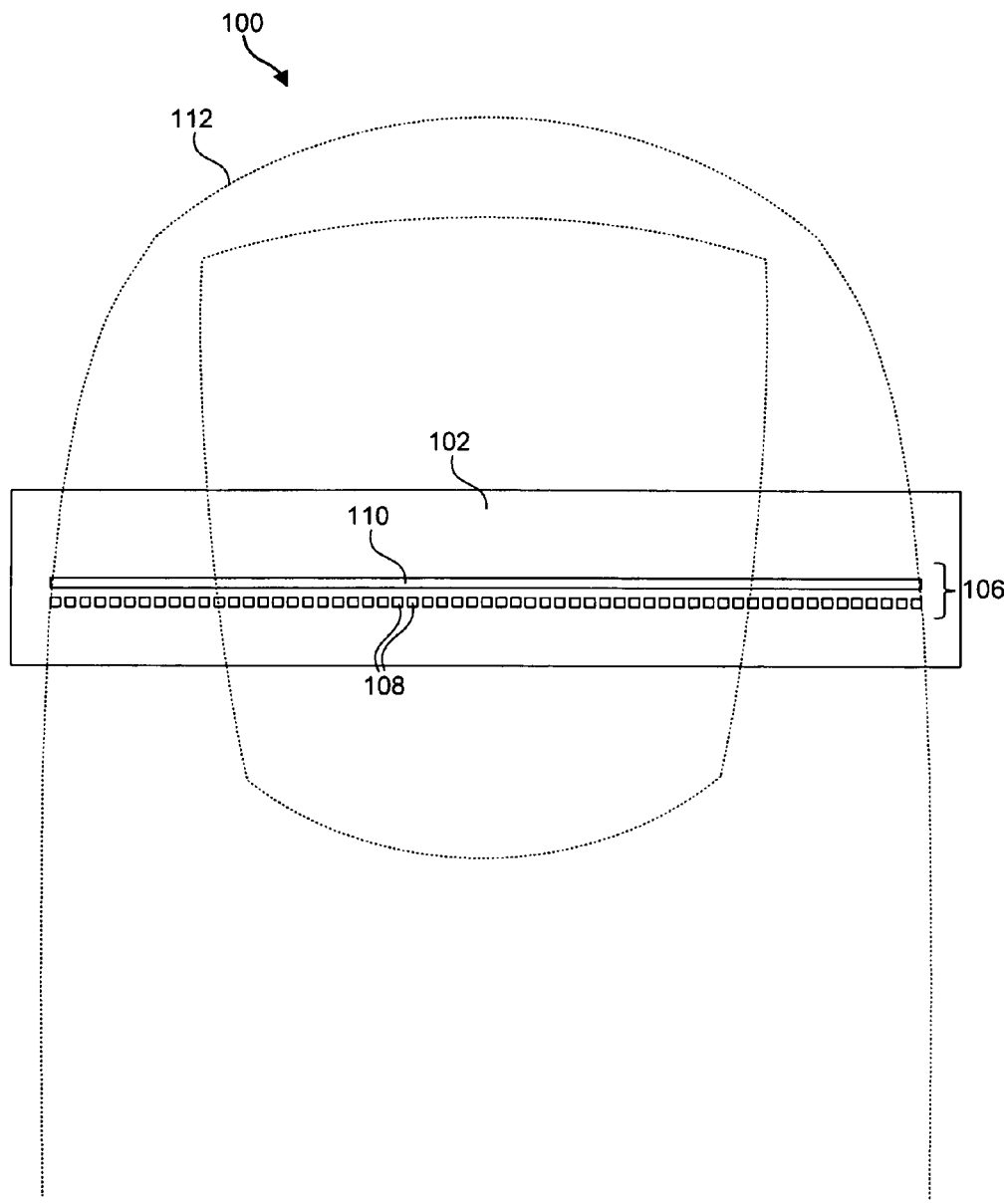
FIG. 1 is a high-level block diagram of one embodiment of a fingerprint sensing area having an array of fingerprint sensing elements.

The invention has been developed in response to the present state of the art, and in particular, in response to the problems and needs in the art that have not yet been fully solved by currently available fingerprint sensors. Accordingly, the invention has been developed to provide novel apparatus and methods for culling substantially redundant data in fingerprint sensing circuits. The features and advantages of the invention will become more fully apparent from the following description and appended claims and their equivalents, and also any subsequent claims or amendments presented, or may be learned by practice of the invention as set forth hereinafter.

Consistent with the foregoing, an apparatus for culling substantially redundant data in fingerprint sensing circuits is disclosed in one embodiment of the invention as including an input module, a storage module, a comparator module, and a determination module. The input module may receive sets (e.g., lines) of data samples from an array of fingerprint sensing elements, such as a linear array of fingerprint sensing elements. The storage module may store these sets of data samples. In one embodiment, the storage module stores a first-received set of a data samples in a first data buffer, and stores a second-received set of data samples in a second data buffer. The comparator module may then calculate a difference between each data sample from the first set and a corresponding data sample from the second set. The determination module may count the number of difference values that exceed a predetermined difference limit, and identify the second set of data samples as redundant if the cumulative number of difference values that exceed the predetermined difference limit is less than a pre-set count limit.

In certain embodiments, the determination module may overwrite the first-received set of data samples with an incoming set of data samples in the event the number of difference values counted exceeds the pre-set count limit. Alternatively, the determination module may overwrite the second-received set of data samples with the incoming set of data samples if the number of difference values counted is less than the pre-set count limit.

In one embodiment, the apparatus further includes a header module. The header module may attach a header to the second-received set of data samples, identifying the second set as redundant, if the number of difference values counted is less than the count limit. In some embodiments, the determination module may transmit the header, with or without the second set of data samples attached, to the host system. In other embodiments, the determination module may discard the second set of data samples if the number of difference values counted is less than the count limit.

In another embodiment of the invention, a method to cull substantially redundant data in a fingerprint sensing circuit is disclosed. The method may include initially receiving first and second sets of data samples from an array of fingerprinting elements. A difference may then be calculated between each data sample in the first set and a corresponding data sample in a second set. The difference values exceeding a predetermined difference limit may be counted. If the number of difference values counted is less than a predetermined count limit, the second set of data samples may be identified as redundant.

In certain embodiments, the first set of data samples may be stored in a first data buffer while the second set of data samples may be stored in a second data buffer. The first set of data samples in the first data buffer may be overwritten with a third set of data samples if the number of difference values counted is greater than the count limit. Otherwise, the second set of data samples in the second data buffer may be overwritten with the third set of data samples.

In one embodiment, the method may further include attaching a header to the second set of data samples to identify such samples as redundant if the number of difference values counted is less than the count limit. The header may then be transmitted to the host system with or without the second set of data samples attached. Alternatively, the second set of data samples may be suppressed or discarded.

In another embodiment of the invention, a system to cull substantially redundant data in a fingerprint sensing circuit may include a fingerprint sensor, a host system, and a culling module. The fingerprint sensor may include an array of fingerprint sensing elements to generate sets (e.g., lines) of data samples when scanning a fingerprint. The culling module may cull redundant data that is generated by the fingerprint sensor. In selected embodiments, the culling module may include means for receiving and storing sets of data samples; means for calculating differences between data samples in the sets; means for counting the number of difference values that exceed a difference limit; and means for identifying a set of data samples as redundant in the event the number is less than a count limit.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, user interfaces, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Referring now to FIG. 1, in one embodiment, a fingerprint sensor 100 in accordance with the invention may include a fingerprint sensing area 102 having an array of fingerprint sensing elements 106. A fingerprint sensing element 106 may include, for example, a transmitter element 108 and a receiver element 110, as discussed in more detail below.

In operation, a user may swipe a finger 112 over the fingerprint sensing area 102 to identify or verify a fingerprint. As shown in FIG. 1, the fingerprint sensing area 102 may be sized and oriented such that the array of fingerprint sensing elements 106 captures only a small portion of the overall fingerprint. In certain embodiments, for example, the fingerprint sensing area 102 may be designed to capture one "line" of a fingerprint at a time. As the fingerprint is swiped across the fingerprint sensing area 102, successive "lines" may be captured and later reconstructed for identification and/or identity verification purposes, as is known in the art.

In certain embodiments, each transmitter element 108 may emit a probing signal, one after the other. As explained in more detail below, the probing signal emitted by each transmitter element 108 may comprise a series of probing pulses, such as a series of square waves. Similarly, the probing signal emitted by each transmitter element 108 may be detected by one or more receiver elements 110. The receiver elements 110 may generate a response signal comprising a series of response pulses, in response to the probing signal. The magnitude of the response signal measured at the receiving element 110 may depend on various factors, such as whether a finger 112 is present over the fingerprint sensing area 102, and more particularly whether a papillary ridge or valley is near the transmitter element 108 that is emitting the probing signal. The magnitude of the signal may be directly related to the RF impedance of a papillary ridge or valley residing near the gap between the transmitter elements 108 and the receiver element 110.

Unlike many conventional fingerprint sensors that employ a single large transmitter element 108 with a large array of receiver elements 110, some embodiments of the present invention may include a single or small number of receiver elements 110 and a comparatively larger number of transmitter elements 108. Utilizing a single receiver element 110 and multiple transmitter elements 108 may enable use of a high quality receiver having a much better dynamic range than would otherwise be possible using multiple receiver elements 110.

Referring now to FIG. 2, in selected embodiments, the fingerprint sensing elements 106 may operate at fixed time intervals to produce a stream of data samples 200 represented as "lines" 202 of fingerprint data. Each data sample 200 may correspond to a different transmitter element 108 and may be assigned a numerical value (e.g., a number between 0 and 255) depending on the strength of the signal measured at the receiver element 110 for a particular transmitter element 108. Successive lines 202 of data may be captured and compared, sample 200 by sample 200, to identify and cull lines 202 that are substantially redundant, as discussed in more detail below.

In order to identify whether a line of data samples is substantially redundant in view of another line, a reference line 204 may be initially established. By default, a first-captured line 202a of data may be deemed the initial reference line 204. Each subsequent line 202b-e may be compared to the reference line 204 until a new unique line 202 is encountered. The new unique line 202 may then replace the reference line 204.

As additional lines 202b-e are scanned, each of these lines may be compared to the reference line 204. More specifically, each of the data samples 200a-m of the lines 202b-e may be compared to the data samples 200a-m of the reference line 204. If the enough of the data samples of a line 202b-e are different enough from the samples of the reference line 204, the line 202b-e may be considered "unique" and become the new reference line 204.

In order to compare lines 202, two initial data values may be established: a "difference limit" and a "count limit." The "difference limit" may define how different data samples 200 must be to be considered unique relative to one another. The difference limit may be set to compensate for natural fluctuations due to noise or other natural variations that may not reflect actual changes in the fingerprint data. The "count limit," on the other hand, may define how many "different" data samples 200 the lines 202 must have for the lines 202 to be considered unique.

For example, consider a difference limit that is set at a numerical value of five (5). If the numerical difference between a first data sample 200a in a first line 202a and a first data sample 200a in a second line 202b is greater than five (5), the first data sample 200a of the second line 202b may be considered unique relative to the first data sample 200a of the first line 202a. Alternatively, if the numerical difference between the first data sample 200a in the first line 202a and the first data sample 200a in the second line 202b is less than five (5), the first data sample 200a of the second line 202b may be deemed to be redundant (not unique) relative to the first data sample 200a of the first line 202a. This comparison may be performed for each data sample 200a-m in the line 202a and each data sample 200a-m in the line 202b.

Next, the number of "unique" data samples may be counted and compared to the count limit. For example, if the count limit is also set at five (5), then five (5) data samples 200 in a line 202 must be deemed to be unique relative to the reference line 204 for the line to be considered unique. If there are not five unique data samples, the line 202 may be considered redundant. This may allow the line to be discarded, suppressed, or marked as redundant as will be explained in more detail hereafter.

Consider the example provided in FIG. 3 where the count limit is set at five (5). As shown, a first-captured data line 202a may be initially deemed the reference line 204. Comparing each data sample 200a-m of the reference line 204 to each data sample 200a-m of the next line 202b may result in a determination that data sample 200b and data sample 200i of the second line 202b are unique (as indicated by the "X") in view of the corresponding samples 200b, 200i of the reference line 204. Since only two data samples 200 in the second line 202b are deemed substantially unique, however, and because the count limit is five (5), the line 202b may be deemed to be redundant in view of the reference line 204.

This process may continue, with each data sample 200a-m of the reference line 204 being compared with the corresponding data sample 200a-m of each subsequent line 202b-e, until the number of data samples 200 deemed substantially unique in a particular line 202 is equal to or greater than the count limit of five (5). In this example, the fourth line 202d has six (6) substantially unique data samples 200b, 200c, 200e, 200h, 200i, 200l relative to the reference line 204. Accordingly, the fourth line 202d may then replace the first line 202a as the reference line 204.

Comparing all subsequent lines to a reference line 204 avoids the possibility that all lines 202 will be considered redundant where there are slow changes between adjacent lines 202. For example, consider the case where each line 202 changes by only a single data sample 200 with respect to the previous line 202. If the count limit is set at two (2), no line would ever be considered unique if compared to the immediately preceding line. That is, each line 202 would be deemed to be redundant of the line 202 immediately before it. By comparing each line to a reference line, rather than the immediately preceding line, changes will accumulate until a new unique reference line is eventually established.

Figure 4:
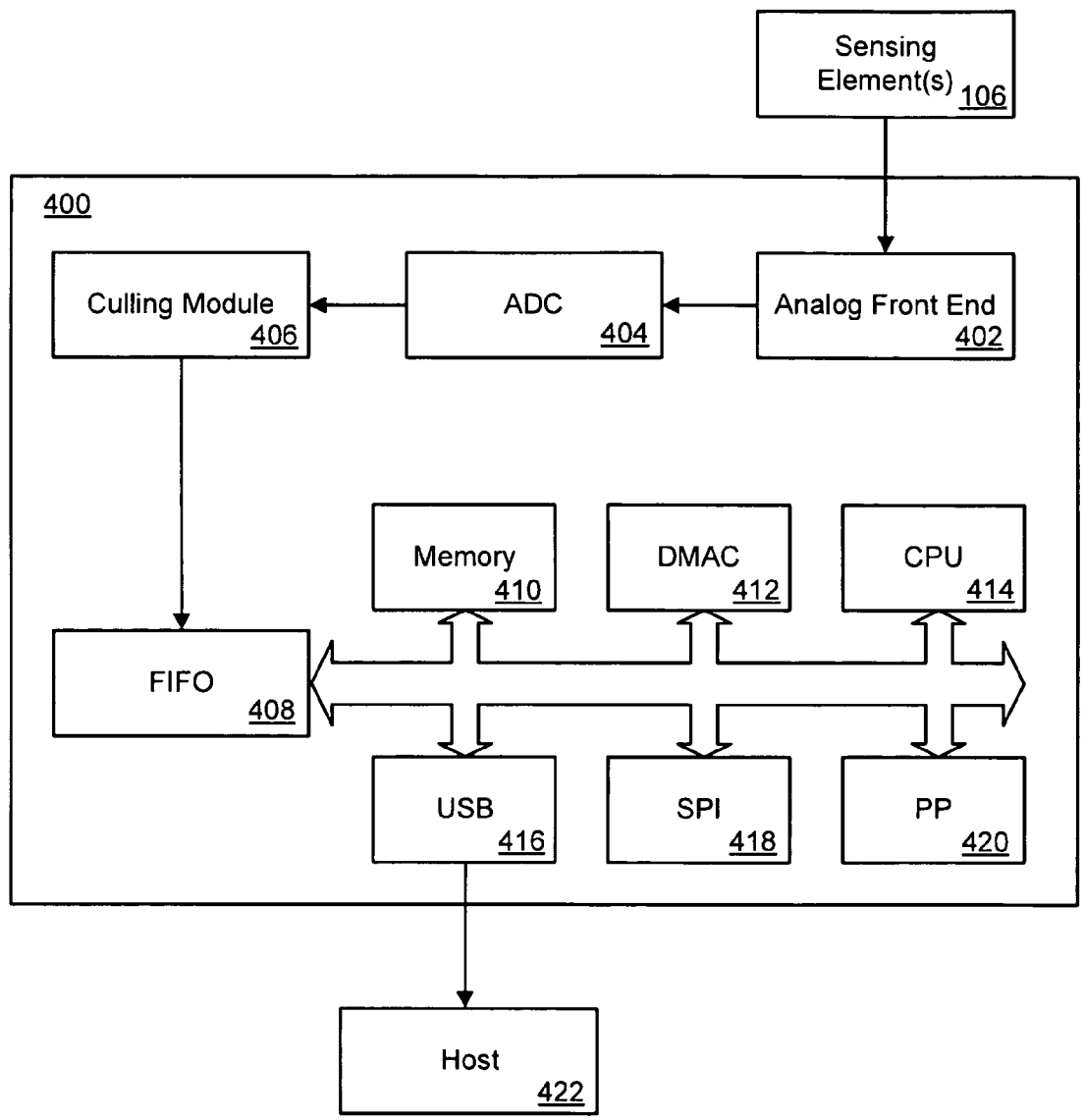
FIG. 4 is a block diagram of various hardware components that may be included in a fingerprint sensing circuit in accordance with the present invention.

Referring now to FIG. 4, a fingerprint sensor 100 in accordance with the present invention may include a fingerprint sensing integrated circuit or chip 400. In selected embodiments, the fingerprint sensing area 102 (including the transmitter and receiver elements 108, 110) may be physically decoupled from the fingerprint sensing integrated circuit or chip 400, as illustrated in FIG. 4. Nevertheless, the features disclosed herein may be applicable to fingerprint sensors 100 with sensing elements 108, 110 that are located on or off the chip 400.

In operation, the response signal generated by the receiver element 110 may be received by an analog front end 402, where it may be amplified and/or passed through various filters to remove noise or other unwanted components from the signal. The amplified and/or filtered analog signal may then be processed by an analog-to-digital converter (ADC) 404, where it may be converted to a sequence of bits, or data samples 200. These data samples 200 may represent lines 202 of data, as discussed above with reference to FIGS. 2 and 3.

The lines 202 of data may then be transmitted to a culling module 406. The culling module 406, as discussed in more detail below, may identify substantially redundant lines 202 such that they may be culled, suppressed, or marked as redundant prior to being transmitted to a host system 422.

Generally, embodiments of fingerprint sensors 100 in accordance with the present invention may scan lines 202 of data at a relatively constant rate. As a result, a significant amount of substantially redundant data may be received by the receiver element 110, for instance, if a finger 112 is not present over the fingerprint sensing area 102, or if a finger 112 is stationary or moving very slowly over the fingerprint sensing area 102. In some embodiments, this redundant data may be marked so that it may be discarded before transmission to a host system 422. By culling such redundant data, system bandwidth and the amount the energy that is required to process redundant data may be reduced.

Data received from the receiver element 110 and not discarded by the culling module 406 may be received and stored in a FIFO buffer 408. The FIFO 408 may be coupled to a bus 424, which may communicate with any of several components, such as a CPU 414, memory 410, a direct memory access controller (DMAC) 412, and the like. The bus 424 may also communicate with one or more interfaces, such as a USB interface 416, Serial Peripheral Interface (SPI) interface 418, parallel port (PP) interface 420, or the like.

The CPU 414 and/or DMAC 412 may retrieve line data 202 from the FIFO 408, possibly perform operations on the line data 202, and store the line data 202 in memory 410. This line data 202 may then be transmitted to a host system 422 through one or more of the interfaces 416, 418, 420. The host system 422 may reconstruct fingerprint image data from the line data 202, and compare the fingerprint image data to previously stored fingerprint patterns using various matching algorithms to authenticate a user's fingerprint.

Figure 5:
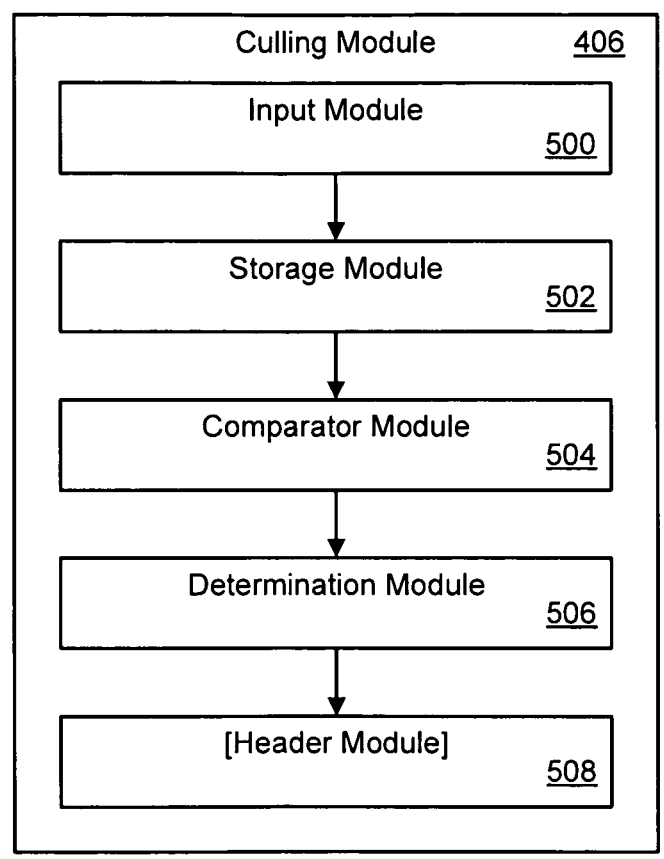
FIG. 5 is a high-level block diagram of one embodiment of a culling module in accordance with the present invention.

Referring now to FIG. 5, in selected embodiments, a culling module 406 in accordance with the present invention may include an input module 500, a storage module 502, a comparator module 504, a determination module 506, and, in some cases, a header module 508. As discussed above, the culling module 406 may operate to mark, suppress, or cull substantially redundant data prior to transmitting it to a host system 422. In this manner, the culling module 406 may reduce the bandwidth and energy that is required to transmit and process redundant data.

In general, the input module 500 may be configured to receive lines 202 of data from an array of fingerprint sensing elements 106. The storage module 502 may then store each of the data lines 202 in, for example, designated data buffers. The comparator module 504 may then compare the data lines 202 to calculate the difference between the data samples of the data lines 202. The determination module 506 may then determine if the lines are unique or redundant based on the number of samples that are unique. In selected embodiments, a header module 508 may generate a header identifying a data line as redundant. This header may be output by the culling module 406 and transmitted, with or without the associated line data 202, to another component in the fingerprint sensing integrated circuit 400. In some cases, the header information may be transmitted to the host system 422. In any case, the header information may cause the associated line data 202 to be discarded or ignored by the recipient component.

Figure 6:
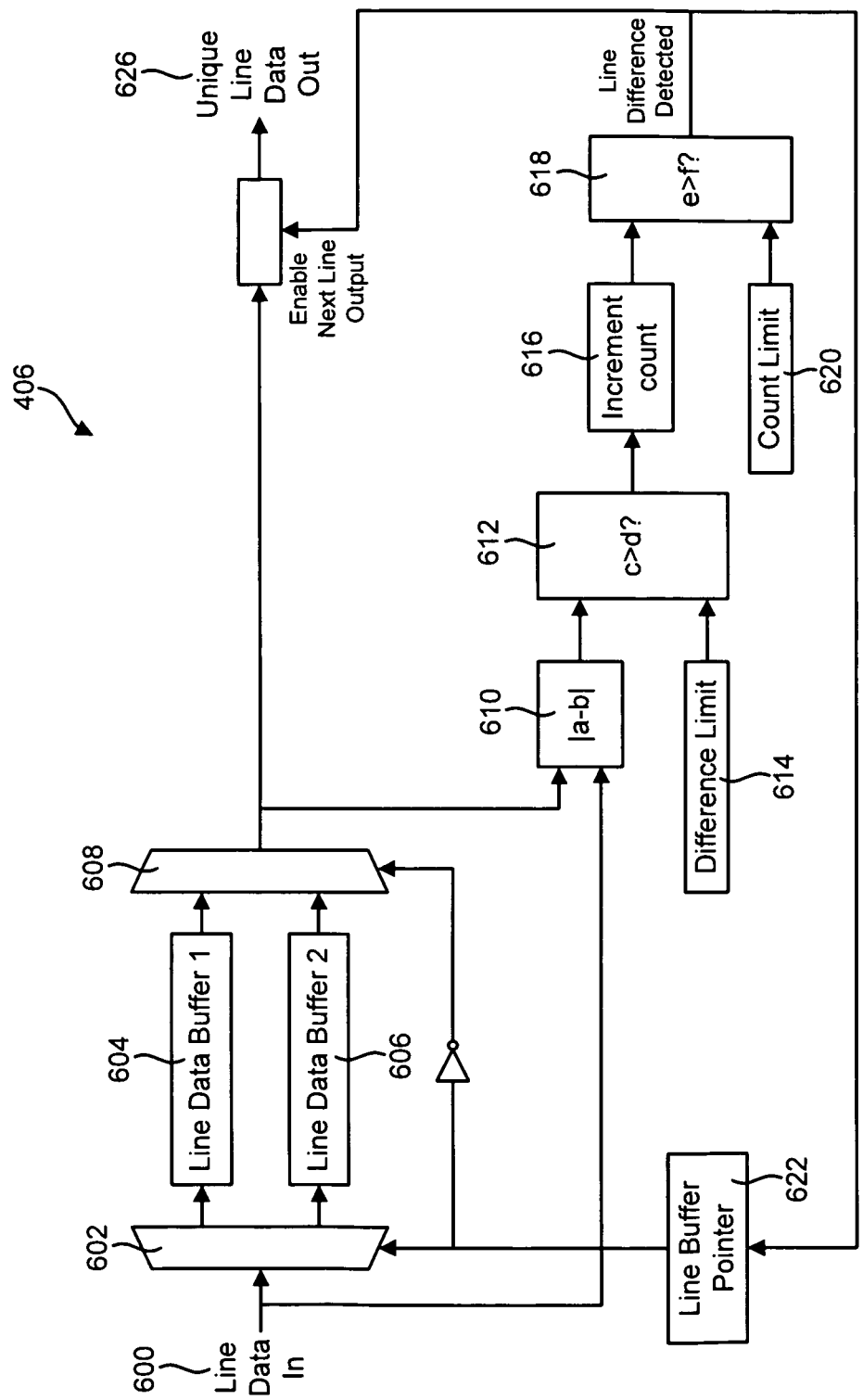
FIG. 6 is a more detailed block diagram of one embodiment of a culling module in accordance with the present invention.

Referring now to FIG. 6, a more detailed embodiment of the culling module 406 of FIG. 5 is illustrated. In selected embodiments, the culling module 406 may receive new line data 600 from the ADC 404, which may be forwarded to a demultiplexer 602. As previously described, this new line data 600 may include data samples 200. The demultiplexer 602 may then direct the new line data 600 into one of two data buffers 604, 606 as designated by a line buffer pointer 622. The other buffer 604, 606 may contain the reference line data 204.

A multiplexer 608 may route the reference line data 204 from the buffers 604, 606, to a logic module 610, where each data sample 200 from the new line 202 (originating at "line data in" 600) may be compared to a corresponding data sample 200 from the reference line 204. For example, the logic module 610 may calculate the difference between each data sample 200 in the new line 202 and the corresponding data sample 200 in the reference line 204.

At a logic module 612, each resulting difference value may be compared to a predetermined difference limit 614. If a difference value is greater than, or in some embodiments, greater than or equal to, the predetermined difference limit 614, a logic module 616 may increment a count value. Otherwise, the count value may be maintained at its current value. Thus, the count value may represent the number of data samples 200 in the new line 202 which are sufficiently unique in view of the data samples 200 in the reference line 204. In any case, the logic modules 610, 612, 616 may process each data sample 200 in the new line 202 before moving to a logic module 618.

At the logic module 618, the count may be compared to a predetermined count limit 620. This count limit 620 may provide a threshold for determining whether the number of difference values that exceed the difference limit 614 is sufficient to consider the new line 202 unique in view of the reference data line 204. If the count is greater than the count limit 620, the new line 202 may be output 626 from the culling module 406. Otherwise, the line 202 may be suppressed or discarded because it is redundant.

Discarding or culling a redundant line 202 may occur at any location in the system, including within the culling module 406. In some cases, for example, a header may be attached to the line 202 to indicate that the line 202 is substantially redundant. The header and/or the line 202 may then be output 626 from the culling module 406. The header and/or line 202 may be discarded by any component in the fingerprint sensing integrated circuit 400 or by the host system 422.

The line buffer pointer 622 may toggle the demultiplexer between the data buffers 604, 606 based on whether a new line 202 is determined to be unique in view of the reference line 204. For example, if a new line 202 is determined to be unique, the pointer 622 may route a new incoming line 202 to overwrite the previous reference line 204. In this manner, the new line 202 becomes the reference line 204.

If, however, the new line 202 is determined to be substantially redundant in view of the reference line 204, the line buffer pointer 622 may route the next incoming line 202 such that it overwrites the new line 202. In this manner, the previous reference line 204 is maintained.

Figure 7:
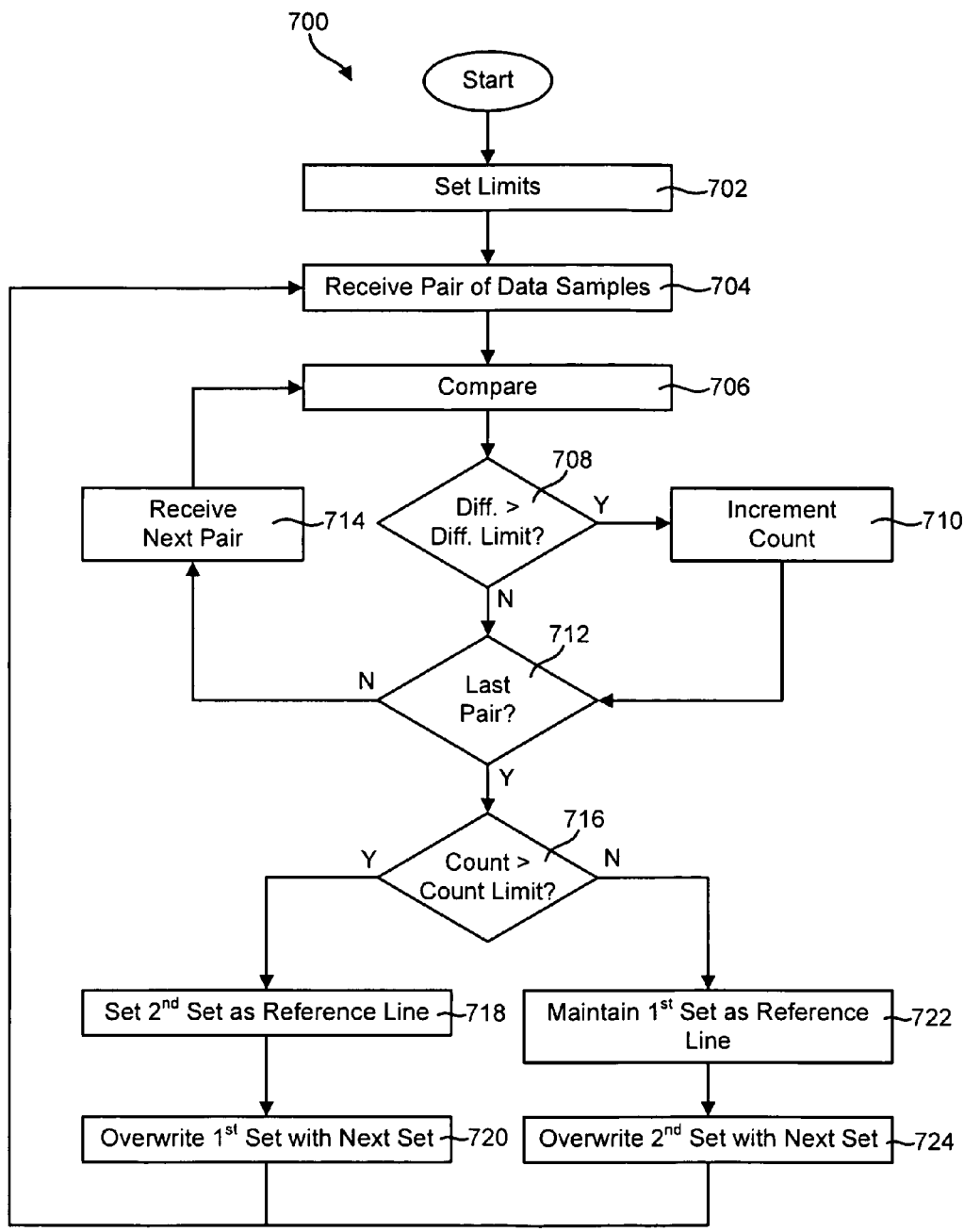
FIG. 7 is a flow chart detailing one embodiment of a method for culling substantially redundant data in a fingerprint sensing circuit in accordance with the invention.

Referring now to FIG. 7, a method 700 for culling substantially redundant data in a fingerprint sensing circuit 400 in accordance with the invention may include initially establishing 702 a difference limit and a count limit. As previously mentioned, the difference limit may be used to determine whether a data sample is unique relative to another data sample. Similarly, the count limit may be used to determine whether a line is unique relative to another line.

A pair of data samples 200, one from an incoming data line 202 and a corresponding sample 200 from a reference data line 204, may then be received 704 and compared 706. More specifically, a difference may be calculated between the data sample 200 from the incoming data line 202 and the corresponding data sample 200 from the reference data line 204. The difference between the two data samples 200 may then be compared 708 to the predetermined difference limit. If the difference is greater than the difference limit, or in some embodiments greater than or equal to the difference limit, a count value may be incremented 710. If the difference is less than the difference limit, the method may proceed to a step 712.

At step 712, the method 700 may determine whether the subject pair of data samples 200 is the last pair of data samples 200 in the subject data lines 202, 204. If not, the next pair of data samples 200 may be received 714 from the data line 202 and the reference line 204. The method 700 may then return to the compare step 706.

If, however, the subject pair of data samples 200 is the last pair of data samples 200 in the subject data lines 202, 204, the method 700 may proceed to a test 716. At the test 716, the count value may be compared to the count limit set in step 702. If the count is less than the count limit, the reference line 204 may be maintained 722 as the reference line 204, and the current data line 202 may be overwritten 724 with the next data line 202. If the count is greater than the count limit, the current data line 202 may be established 718 as the new reference line 204, and the previous reference line 204 may be overwritten 720 with the next data line 202. In any case, the method 700 may then return to receive 704 a next pair of corresponding data samples 200 from the new reference line 204 and the next incoming data line 202.

The apparatus and methods disclosed herein, in addition to being useful for line culling, may be used for motion detection. That is, the culling module 406 may be used for motion detection because it may be configured to suppress data until a finger moves on the fingerprint sensing area 102. This is because the data will not change until a finger moves. In selected embodiments, the header module 508 may set a flag in each line header which may indicate whether a line is unique or not. The CPU 414 may use the flag in a motion detection algorithm.

As previously mentioned, the culling module 406 may be configured to perform line-by-line comparisons on all data that is received by the culling module 406. In selected embodiments, however, the culling module 406 may be programmed as to whether it suppresses redundant data or not. In some cases, where redundant is encountered, the culling module 406 may be configured to transmit line headers without transmitting the redundant line data so that the host system 422 knows that a line of data was suppressed.

The following are various non-limiting example of actions that may be taken by the culling module 406 when redundant data is encountered: In a first embodiment, the culling module 406 could output each header and all data, whether redundant or not. A culled header bit could be used to indicate whether a line is redundant in view of a previous line. In a second embodiment, the culling module 406 could output a header for all lines received (whether redundant or not), but with unique line data attached. That is, the culling module 406 could output the last unique line data in place of redundant line data. A culled header bit could indicate similarity with a last unique line.

In a third embodiment, the culling module 406 could output a header for all lines received. However, the culling module 406 would transmit only unique line data, while suppressing redundant line data. A culled header bit could indicate similarity with a last unique line. In a fourth embodiment, the culling module 406 could output unique line headers and unique line data, while suppressing similar line headers and similar line data. In this embodiment, the culled header bit could always be clear. These represent just a few examples and are not intended to be limiting.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a computing device configured to:
receive a reference set of data samples, each data sample in the reference set of data samples being an output of a respective fingerprint image sensing element in a one dimensional linear array of fingerprint image sensing elements, oriented to capture one line of a fingerprint image at a time, each line later used to reconstruct an identifying fingerprint image and to receive a next successive set of data samples, each data sample in the next successive set of data samples being a subsequent output of the respective fingerprint image sensing element in the one dimensional linear array of fingerprint sensing elements;
determine the existence of a difference between a data sample from the reference set and a corresponding data sample from the next successive set, which difference exceeds a selected threshold value, for each data sample from the reference set and the corresponding data sample from the next successive set;
count the number of times the difference exceeds the threshold in comparing the reference set to the next successive set; and
identify the next successive set of data samples as redundant when the number is less than a selected count.

2. The apparatus of claim 1, wherein the computing device is configured to store the reference set of data samples in a first data buffer and store the next successive set of data samples in a second data buffer.

3. The apparatus of claim 2, wherein the computing device is configured to overwrite the reference set of data samples in the first data buffer with the next subsequent set of data samples when the number is greater than the selected count.

4. The apparatus of claim 3, wherein the computing device is configured to overwrite the next successive set of data samples in the second data buffer with a further next successive set of data samples.

5. The apparatus of claim 1, wherein the computing device is configured to attach a header to the next successive set of data samples.

6. The apparatus of claim 5, wherein the header identifies the next successive set of data samples as redundant where the number is less than the selected count.

7. The apparatus of claim 6, wherein the computing device is configured to transmit the header to a host system in the event the number is less than the selected count.

8. The apparatus of claim 1, wherein the computing device is configured to discard the next successive set of data samples when the number is less than the selected count.

9. A method comprising:
receiving, via a computing device, a reference set of data samples, each data sample in the reference set of data samples being an output of a respective fingerprint image sensing element in a one dimensional linear array of fingerprint image sensing elements, oriented to capture one line of a fingerprint image at a time, each line later used to reconstruct an identifying fingerprint image;
receiving, via a computing device, a next successive set of data samples, each data sample in the next successive set of data samples being a subsequent output of a respective fingerprint image sensing element in the one-dimensional linear array of fingerprint image sensing elements;
calculating, via a computing device, a difference between a data sample from the reference set and a corresponding data sample from the next successive set and providing a plurality of difference values, for each data sample from the reference set and the corresponding data sample from the next successive set;

counting, via a computing device, the number of difference values that exceed a selected threshold, for each data sample from the reference set and the corresponding data sample from the next successive set; and identifying the next successive set of data samples as redundant when the number is less than a selected count.

10. The method of claim 9, further comprising storing the reference set of data samples in a first data buffer and storing the next successive set of data samples in a second data buffer.

11. The method of claim 10, further comprising overwriting the reference set of data samples in the reference data buffer with the next successive set of data samples when the number is greater than the selected count.

12. The method of claim 11, further comprising overwriting the next successive set of data samples in the second data buffer with a further next successive set of data samples.

13. The method of claim 9, further comprising attaching a header to the next successive set of data samples, the header identifying the next successive set of data samples as redundant when the number is less than the selected count.

14. The method of claim 13, further comprising transmitting the header to a host system when the number is less than the selected count.

15. The method of claim 9, further comprising discarding the next successive set of data samples when the number is less than the selected count.

16. A system comprising:
a fingerprint sensor comprising one-dimensional linear array of fingerprint sensing elements;
a host system configured to receive sets of data samples from the fingerprint sensor;
and a sensor computing device configured to reduce the amount of substantially redundant sets of data samples data that is transmitted from the fingerprint sensor to the host system, the sensor computing device configured to:
receive a reference set of data samples from the one-dimensional linear array of fingerprint sensing elements, oriented to capture one line of a fingerprint image at a time, each line later used to reconstruct an identifying fingerprint image, and subsequently to receive a next successive set of data samples from the one-dimensional linear array of fingerprint sensing elements;
calculate a difference between each data sample from the reference set and a corresponding data sample from the next successive set and provide a plurality of difference values, for each data sample from the reference set and the corresponding data sample from the next successive set;
count the number of difference values that exceed a selected threshold, for each data sample from the reference set and the corresponding data sample from the next successive set; and
identify the next successive set of data samples as redundant when the number is less than a selected count.

17. The system of claim 16, wherein the sensor computing device is configured to discard the next successive set of data samples when the number is less than the selected count.

18. The system of claim 16, wherein the sensor computing device is configured to attach a header to the next successive set of data samples when the number is less than the selected count, the header identifying the next successive set of data samples as redundant.

19. A non-transitory machine readable medium storing instructions that, when executed by a computing device, cause the computing device to perform a method, the method comprising:
receiving a reference set of data samples, each data sample in the reference set of data samples being an output of a respective fingerprint image sensing element in a one dimensional linear array of fingerprint image sensing elements, oriented to capture one line of a fingerprint image at a time, each line later used to reconstruct an identifying fingerprint image, and a next successive set of data samples, each data sample in the next successive set of data samples being a subsequent output of the respective fingerprint image sensing element in the one dimensional linear array of fingerprint sensing elements;
determining the existence of a difference between each data sample from the reference set and a corresponding data sample from the next successive set, which difference that exceeds a selected threshold value;
counting the number of times the difference exceeds the threshold; and
identify the second set of data samples as redundant when the number is less than a selected count.

20. A biometric sensing system comprising:
a biometric sensor sensing a reference set of data samples, each data sample in the reference set of data samples being an output of a respective biometric image sensing element in a one dimensional linear array of biometric image sensing elements, oriented to capture one line of a biometric image at a time, each line later potentially to be used to reconstruct an identifying biometric image and to receive a next successive set of data samples, each data sample in the next successive set of data samples being a subsequent output of the respective biometric image sensing element in the one dimensional linear array of biometric sensing elements;
a computing device configured to determine the existence of a difference between a data sample from the reference set and a corresponding data sample from the next successive set, which difference exceeds a selected threshold value, for each data sample from the reference set and the corresponding data sample from the next successive set;
count the number of times the difference exceeds the threshold in comparing the reference set to the next successive set; and
identify the next successive set of data samples as redundant when the number is less than a selected count.

* * * * *